United States Patent [19]

Gevers

[11] Patent Number: 4,741,549
[45] Date of Patent: May 3, 1988

[54] EQUALIZING BOOSTER AXLE SYSTEM

[75] Inventor: David Gevers, 8455 Mason Montgomery Rd., Mason, Ohio 45040

[73] Assignees: Robert J. Nadalin, Worcester, Mass.; David E. Gevers, Mason, Ohio; John F. Wenzell, Boylston, Mass.

[21] Appl. No.: 915,504

[22] Filed: Oct. 6, 1986

[51] Int. Cl.⁴ .............................................. B62D 53/04
[52] U.S. Cl. ............................ 280/405 A; 280/81 R; 280/423 R; 280/677
[58] Field of Search ............ 280/405 R, 405 A, 405 B, 280/104, 676, 677, 682, 81 R, 81 A, 81 B, 456 A; 180/21, 22, 23, 24.13

[56] References Cited

U.S. PATENT DOCUMENTS

| | | | |
|---|---|---|---|
| 2,795,178 | 6/1957 | Silver | 280/456 A |
| 2,974,976 | 3/1961 | Lyall | 280/405 R |
| 3,246,884 | 4/1966 | Prichard | 280/81 R |
| 3,298,706 | 1/1967 | Lyall | 280/81 R |
| 3,438,652 | 4/1969 | Hoffacker | 280/81 R |
| 3,910,601 | 10/1975 | Michaud | 280/405 A |
| 3,954,285 | 5/1976 | Goldhofer | 280/405 R |
| 4,262,923 | 4/1981 | Weir | 280/423 B |
| 4,335,898 | 6/1982 | Orosz | 280/405 A |
| 4,423,884 | 1/1984 | Gevers | 280/405 A |

FOREIGN PATENT DOCUMENTS

620378  3/1949  United Kingdom ............ 280/81 R

Primary Examiner—John J. Love
Assistant Examiner—Everett G. Diederiks, Jr.
Attorney, Agent, or Firm—Blodgett & Blodgett

[57] ABSTRACT

A trailer having a variable configuration for carrying heavy loads, including: a main frame, a main suspension system supporting the rear of the main frame, coupling mechanism for coupling the main frame to a power unit with or without an auxiliary trailer and for supporting the front of the frame. Mechanisms for coupling on a variety of auxiliary frames are provided, for the purpose of distributing the weight of the payload and the weight of the trailer itself according to legal requirements and requirements of safety. These mechanisms generally include a front suspension arm joining the main suspension to the auxiliary frame, a main pivot between the main frame and the auxiliary frame, and an additional connecting link between main and auxiliary frames. In a configuration in which the auxiliary axles are located relatively far from the main suspension, the axles are carried on a secondary frame and joined to the main frame by a booster frame which includes a pivoting or self-steering mechanism to limit excessive scuffing of the tires on the booster frame. An equalizing trailer system is easily dismantled for the removal of unneeded booster axles and the shortening of the trailer when relatively light loads are carried. With booster axles removed the equalizing trailer continues to distribute the load among the remaining axles.

12 Claims, 10 Drawing Sheets

EQUALIZING BOOSTER AXLE SYSTEM

FIELD OF THE INVENTION

The field of the present invention is the design and fabrication of freight-transporting trailers, particularly those meant to be towed by a separate power unit or tractor. More particularly, the field of the invention encompasses trailers having one or more multiple axle assemblies with provision for addition of further axle assemblies as required.

BACKGROUND OF THE INVENTION

It has been found that roadways, bridges and the like which are frequently traveled by vehicles carrying extremely heavy loads are subject to serious damage by the passage of such vehicles. It has also been found that such damage may be limited to varying degrees by complicated distributions of the heavy loads across a large number of axles. The relationships of load and axle configuration are, in fact, subject to strict Federal and State regulation. The enforcement of the so-called "Bridge Formula" exemplifies such regulations. Because the size and weight of the loads being transported varies very greatly, it is inefficient in the trucking industry to use the same number of axles for a relative light load as would be needed with an extremely heavy load. Trailers are now available to which auxiliary axles may be added and removed to accommodate various weights and sizes of the load. The present invention is directed to a trailer assembly for transporting large heavy loads, (as well as more moderate loads) by the use of such removable auxiliary axles. More particularly, the invention involves improvements in the connections between an auxiliary or booster frame with its axles assemblies, on the one hand, and the main frame of the trailer, on the other hand, for distribution of weight from the axles supporting the main frame to one or more booster or auxiliary axles.

Trailer assemblies for transporting large, heavy loads generally include a main frame for carrying the load, a kingpin assembly for attaching the main frame to a power unit or towing vehicle to carry the front of the main frame, and a rear axle group for carrying wheels that support the rear of the main frame.

For moderate loads it is sufficient to distribute the weight of the load between the rear axle or axles of the power unit and the axle group at the rear of the trailer. For extreme loads, further distribution of the weight of the load is required. In these instances, one or more booster axles is coupled to the rear of the main frame and some of the load from the multiple axles at the rear of the trailer is distributed to these booster axles.

A number of trailer configurations which have been developed for this purpose, and some additional general background on trailer systems for extremely heavy loads are described in U.S. Pat. No. 4,423,884: Gevers "BOOSTER AXLE CONNECTION SYSTEM FOR A TRAILER ASSEMBLY" the specification which is hereby incorporated by reference. In some prior systems, the connection between the main frame and the booster axles or axles has included a booster beam and a pivot joint beneath the rear of the main frame (or a main frame extension,) pivotally connecting the main frame to the booster beam. Removal of the booster axle or axles requires disassembly of the booster beam or the main frame extension beam. In some configurations this pivot assembly results in an unusable protrusion of considerable lengths from the rear of the trailer.

In other prior configurations, for instance, where the main frame extension is removable, the process of connecting the booster assembly requires exacting alignment procedures. Most such configurations require auxiliary jacking, lifting, and blocking equipment to attach the booster assembly to the trailer main frame.

These prior configurations often resulted in main frame extensions which extend forward as well as rearwardly from the rear axle suspension system. This extension precludes the free placement of such devices as brake valves and air reservoirs which are preferably located in the general area forward of the rear axle.

These and other difficulties and disadvantages found in the prior art devices have been obviated in a novel and non-obvious manner by the devices embodying the present invention.

Therefore, it is one of the primary objects of the present invention to provide a booster axle connection design in which a main pivot between the main frame and a booster frame remains in constant connection while the load distribution is adjusted by a auxiliary link or links.

A related object is to provide a booster axle connection design in which the connection may be made and adjusted without requiring exact pre-alignment of the parts.

Another object of the invention is to provide a booster connection design that includes an adjustment provision such that the rear of the main frame can be set at various heights to compensate for variations in the deflection of the frame and suspension which results from variations in the weight of the load.

Another object of the invention is to provide a booster axle connection design which allows the addition of a third axle to a tandem axle group in such a way that the third (or booster) axle is positioned the same distance behind the last axle of the main suspension as the axles of the main suspension are from each other.

A related object is to provide a booster axle connection design in which each axle of the augmented group assumes an equal share of the payload, whether on level or uneven terrain.

A further object of the invention is to provide a booster axle connection design with the mechanisms necessary for the distribution of the weight of the payload but which is so configured to allow an unobstructed volume of space between main structural frame members in the vicinity of the first main axle, this volume being suitable for the permanent mounting of control equipment, such as brake valves and air reservoirs necessary for optimum trailer operation.

A still further object of the invention is to provide a booster axle connection system which avoids protrusion of structural members above the main frame and in the vicinity of the main axle and avoids interference with the placement of a payload on the main structural members in this vicinity.

It is also a general object of the invention to provide a booster axle connection system which is uncomplicated and rugged in construction, which can be economically manufactured, and which is capable of a long life of useful service with reasonable maintenance.

With these and other objects in view, as will be apparent to those skilled in this art, the invention resides in the combination of parts set forth in the specification and covered by the claims appended to the specification.

SUMMARY OF THE INVENTION

The objects of the invention are achieved in a trailer assembly comprising: a main frame on which the payload is placed, a kingpin assembly which supports the front of the main frame and provides a connection between the main frame and a towing vehicle (power unit), a main suspension system connecting a main axle group to the main frame, a booster assembly containing one or more booster axles, a secondary suspension system connecting the booster axle group to the booster axle assembly, a connection means between the secondary frame the main frame, and a linking means between the booster assembly and the main suspension.

In one aspect of the invention, the booster assembly includes a secondary frame with auxiliary axles and a separate booster frame which mediates the connection between the secondary frame and the main frame. The main frame and the booster assembly are each provided with a corresponding main pivot point on a main pivot flange. The main suspension is connected to the booster assembly by a front suspension arm which is pivotally connected, in addition, to the main frame.

In another aspect of the invention in which the mediating booster frame per se is eliminated, the booster assembly simply comprises a single booster axle with associated secondary frame and suspension. In this aspect, a front suspension arm is also provided which includes a front suspension arm extension which connects the main suspension on the main frame to the booster axle associated suspension via a mediating pivot point on the main frame.

In a further aspect of the invention, the connection between the main frame and the booster assembly comprises both a pivoting connection between the respective pivot flanges, and an auxiliary assembly link which may comprising linking elements with adjustable length.

Additional features and advantages of the present invention will become apparent in view of the following detailed description of a particular embodiment and some variations of the invention including the presently perceived best mode of carrying out the invention.

BRIEF DESCRIPTION OF THE DRAWINGS

The character of the invention may be best understood by reference to particular structural forms as illustrated in the accompanying drawings. As will be apparent from alternative views, the figures which illustrated side elevational views of various structural elements generally show one side only of the element in question. The various parts of the trailer of the present invention are generally laterally symmetrical about a central vertical plane oriented in the direction of movement of the trailer. Thus the opposite side of an elevational view will generally be a mirror-image of that shown and the individual elements illustrated in each elevational view are generally duplicated by an analogous element on the other side of the trailer section (unless otherwise noted.)

DETAILED DESCRIPTION

A particular embodiment of the present invention as well as several alternative embodiments will be described below in connection with a general trailer configuration to which the invention is particularly adaptable. It is not intended that the present invention be applied in any limited manner to the exact trailer configuration illustrated, since a booster axle connection system according the present invention is advantageously adaptable to other trailer assembly configurations without departing from the scope of the invention as described and claimed below.

Figure 1:
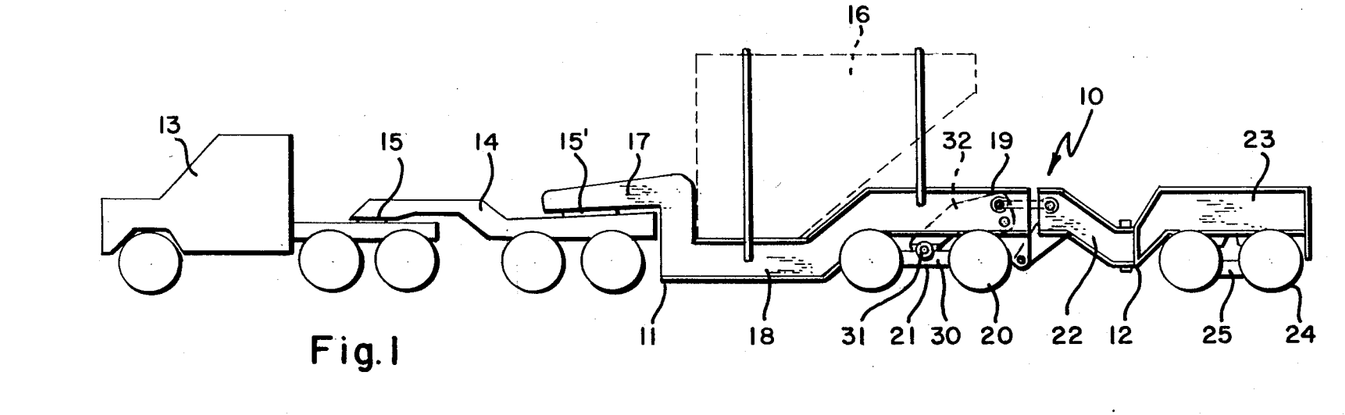
FIG. 1 is a general side elevational view of a trailer constructed according to the present invention along with an auxiliary trailer and a power unit.

Referring first to FIG. 1 a weight-equalizing trailer is illustrated, generally referenced by the numeral 10, which embodies the present invention is illustrated. This configuration includes a main frame 11, a booster assembly indicated by the numeral 12, and a power unit or towing vehicle 13. A kingpin assembly 15 connects the power unit pivotally to the remainder of the trailer configuration. In this particular configuration in which additional tandem axles are added to the rear of the trailer, a balancing auxiliary trailer 14 is interposed between the power unit and the main frame. Thus an additional kingpin assembly 15' pivotally connects to the auxiliary trailer to the main frame. A large and heavy payload 16 is illustrated, being transported by the trailer.

Figure 2:
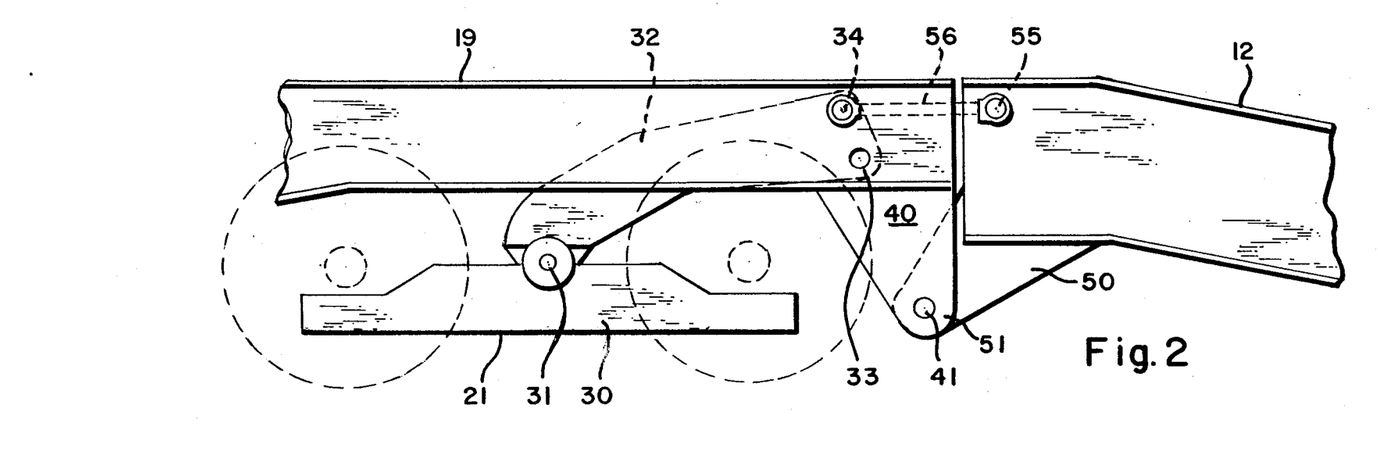
FIG. 2 is a detailed side elevational view of the connecting mechanisms between the main frame and its suspension, on the one hand, and the booster assembly, on the other hand.

In this configuration the main frame includes a front portion 17, a deck 18, and a rear portion 19. The rear portion is supported by a rear axle group 20 including main suspension 21. The booster assembly 12 in this configuration generally includes a separate booster frame 22 a secondary frame 23, a booster axle group 24, and the associated secondary suspension 25. A number of critical aspects of the present invention are illustrated in more detail in FIG. 2 which shows the connections among the main suspension, the main frame, and the booster assembly (in this case the separate booster frame 22.) In the embodiment illustrated the main suspension includes a walk beam 30. The walk beam includes a walk beam pivot 31 to which a front suspension arm 32 is pivotally connected. The front suspension arm curves upwardly and rearwardly toward the booster assembly and includes, at the end distant from the walk beam, several connecting points. In the embodiment illustrated the front suspension arm is provided with two connecting points, a first front suspension arm to main frame pivot 33 and a link element connecting point 34. It should be kept in mind in this context (and elsewhere unless otherwise noted) that the walk beam, rear suspension arm, and the connecting points are duplicated on the other said of the main frame and are symmetrically arranged with the axial plane of the trailer.

Figure 3:
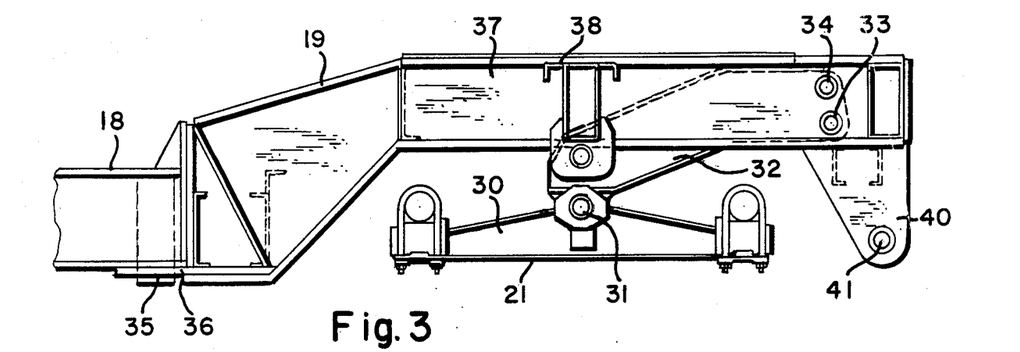
FIG. 3 is a side elevational view of the rear portion of the main frame including its suspension and the front suspension arm.

A more detailed view of the construction of the rear portion of the main frame is shown in FIG. 3. In this case the rear portion 19 is removably connected to the deck portion 18 by a mechanism which includes a post 35 and a flange 36. This rear portion of the main frame is basically formed of two generally parallel structural members 37 and 38 of I-beam construction, using heavy enough flange and web material to support extremely heavy loads. A number of cross members or webbing of paired or unpaired channel-beams are provided, as well as intermediate I-beam reinforcement flanges.

The front suspension arm 32 (which also consists of a pair of structural members connected by cross-members) has a first end pivoted to the main suspension walk beam at 31. In normal operation the front suspension arm extends upwardly and rearwardly of the walk beam to become, at its other end, substantially parallel with the main structural members of the rear portion of the main frame. At this end, several connecting points are provided. Illustrated here are: a first front suspension arm to main frame pivot point 33 and a link element connecting point 34.

A main frame flange 40 is provided extending downwardly from the rear end of the rear portion of the main frame. The flange is preferably integrally formed on the structural member 37, preferably does not extend further back than the rear of the main frame; and is, of course, duplicated across the main frame on the other main structural member 38. It is provided with a main frame to booster assembly pivot point 41. This pivot point, as well as the others mentioned in the specification unless otherwise noted, is generally comprised of apertures through the associated structural member which apertures are provided with journaling and bearing surfaces as required.

Figure 4:
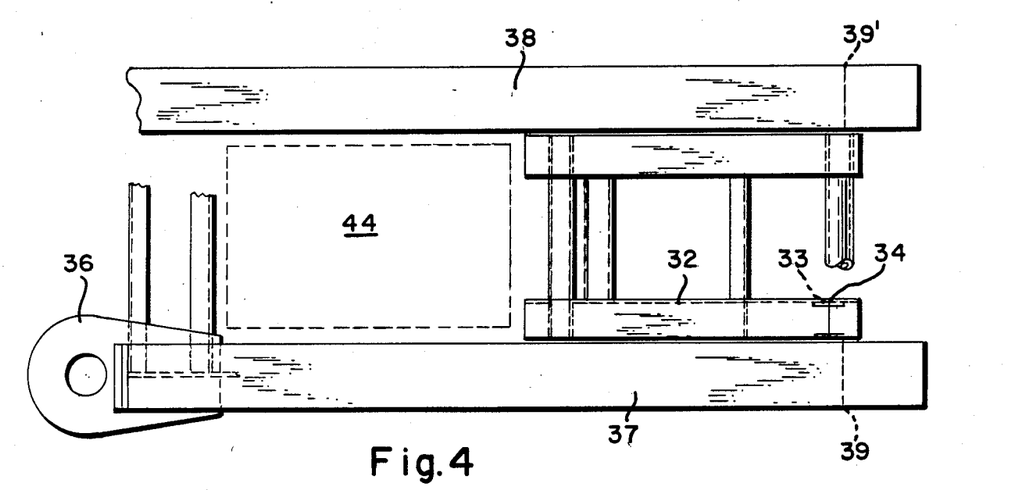
FIG. 4 is a partial top plan view of the rear portion of the main frame indicating the relative location of the front suspension arm to the rest of the rear portion of the main frame and particularly illustrating the space between the rear suspension arm and the location of the connection of the rear portion of the main frame to the rest of the main frame.

The top plan view of the rear portion of the main frame, as set out in FIG. 4, shows the location of the front suspension arm 32 in relation to the main structural member 37 and 38. As this figure best illustrates, the structure of the present invention provides for a large and relatively unobstructed available space 44 in the area enclosed by broken lines. Although it may be desirable to direct some cross-members through this volume, it is basically available for the installation of auxiliary equipment: brake mechanisms, air reservoirs, hydraulic controls, built-in jacking and lifting equipment, etc.

Figure 5:
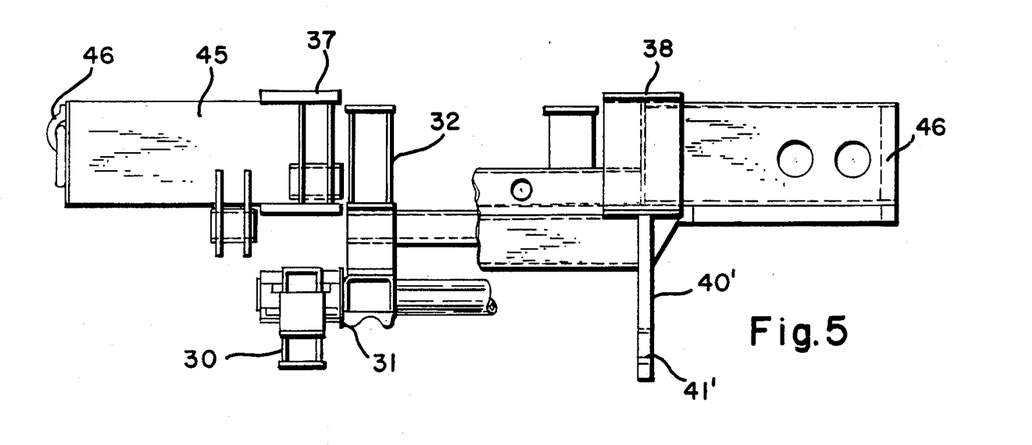
FIG. 5 is a rear elevational view, with portions cut away, of the rear portion of the main frame.

FIG. 5 is a rear elevational view of this rear portion of the main frame further illustrating the relation between the rear suspension arm 32 and the main structural members 37 and 38. A main cross-member 45 provides solid grappling points such as 46 for the stabilization of loads and other purpose. A standard tail-light panel is provided which is notched between the main beams 37 and 38. (The panel has been cut away on the left to illustrate structures behind it). The notch provides access from the booster assembly to the connection points on the end of the front suspension arm 32.

Figure 6:
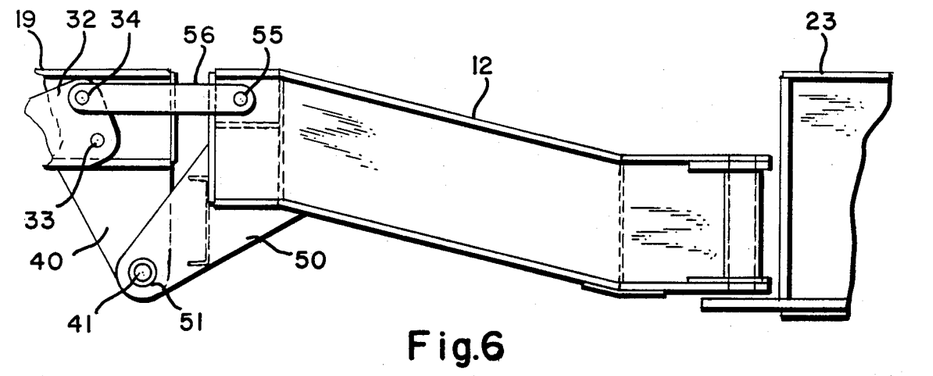
FIG. 6 is a side elevational view of the separate booster frame of the present invention including a partial view of its connection with the main frame and the secondary frame respectively.

In this preferred embodiment a relatively short booster frame 12 is provided as shown best in FIG. 6. This assembly also consists of main structural members and cross members. In FIG. 6 the visible main structural member is provided with an integral flange extending downward and forward. The flange 50 is provided with a booster frame to main frame pivot point 51. In the preferred embodiment either the main frame flange 40 or the booster assembly flange 50 (which are opposed to each other in the assembled structure) consists of two flange elements separated by the widths of the opposed flange. The booster frame flange is, of course, repeated on the other side of the booster frame. The connection between the main frame and the booster frame consists partially of the joining of the main frame flange 40 with the booster frame flange 50. The booster frame is further provided with a link element connecting point 55. A link element 56 whose length may be pre-established or adjustable, links the booster frame link element connecting point 55 with the front suspension arm link element connecting point, 34 both connections being of a pivotal nature. The link element 56 is paired with a similar element on the other side of the frame.

Figure 7:
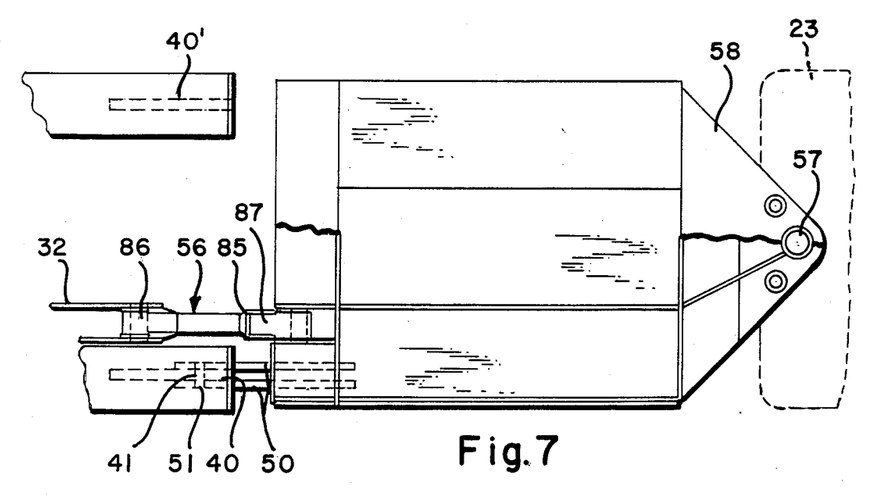
FIG. 7 is a top plan view of the booster frame as shown in FIG. 6, FIGS. 8, 9, and 10 are details of the connection between the booster frame and the secondary frame.

The booster frame is connected at its other end to the secondary frame 23 as illustrated in FIG. 7. This connection by a post 57 and a duplex, horizontal, triangular flange 58 allows the secondary frame to pivot in a horizontal plane. This configuration allows self-steering of the booster assembly. This in turn enhances maneuverability, reduces damage to the highway, reduces stress in the trailer due to turning, and saves excessive wear on the auxiliary tires. The nesting of flanges 40 and 50 is shown best in FIG. 7. An adjustable linking element 56 is shown which may be used to adjust the tension or compression between the main frame and the booster frame.

Figure 8:
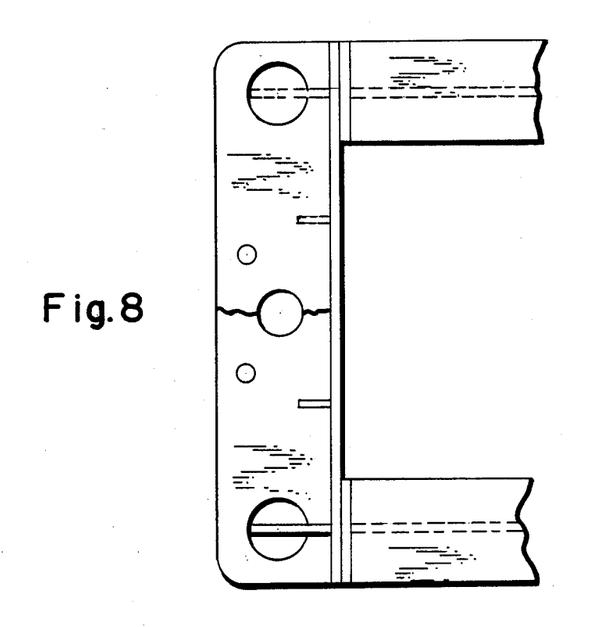
Figure 9:
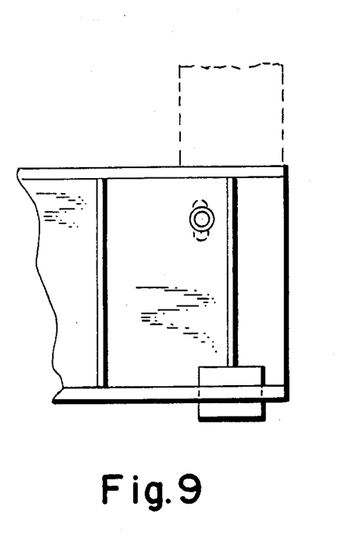
Figure 10:
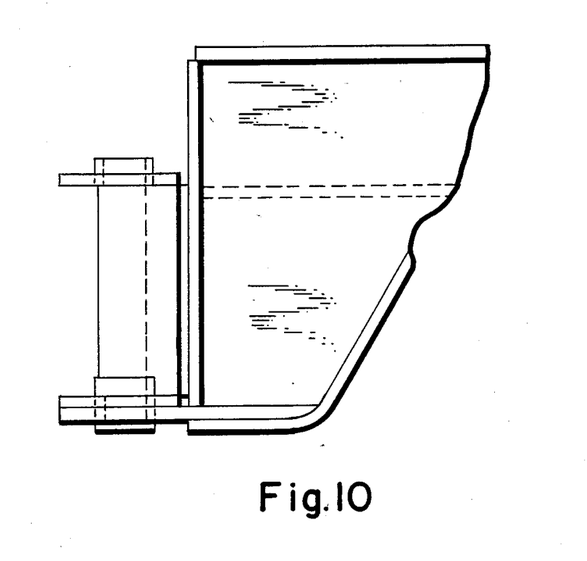

FIGS. 8, 9, and 10 detail the construction of the front end of the secondary frame 23. The illustrated embodiment is suitable for connection to the booster frame described above as well as a variety of other booster frame and main frame configurations.

Figure 11:
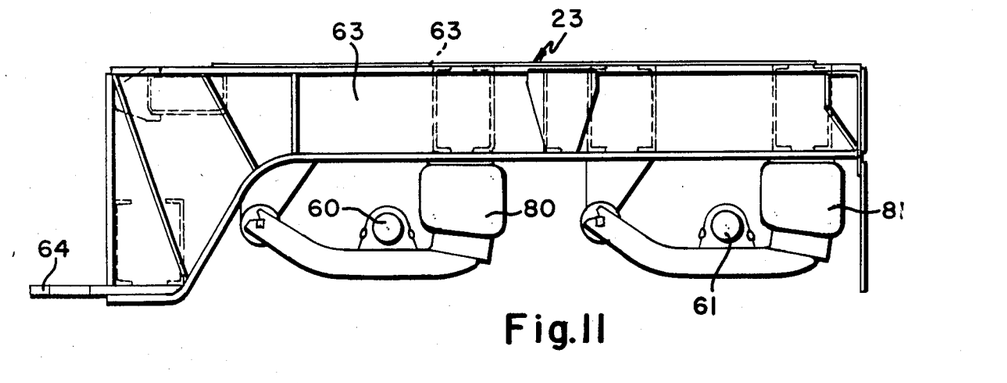
FIG. 11 is a side elevational view of the secondary frame including the secondary suspension.
Figure 12:
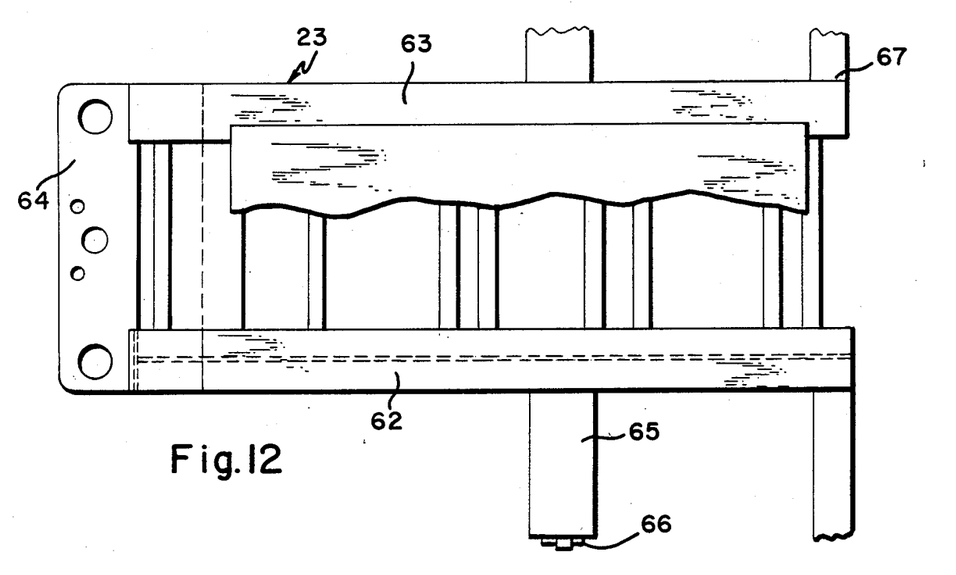
FIG. 12 is a top plane view of the secondary frame or rear tandem assembly.
Figure 13:
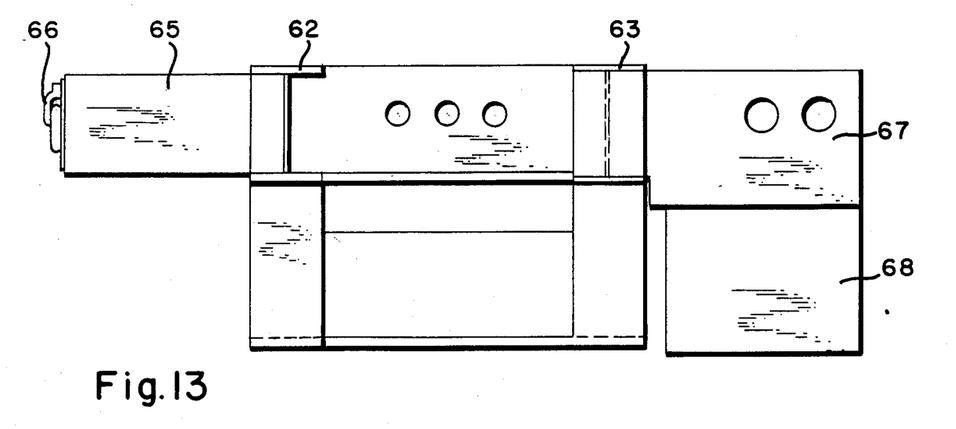
FIG. 13 is a partially cut away rear elevational view of the secondary frame.

A particular structure for a secondary frame is illustrated in FIG. 11. In this configuration separate suspension is provided for each of the two booster axles 60 and 61. It may be desirable, instead, to provide a tandem suspension system such as that provided (in this embodiment) for the main suspension as shown in FIG. 3. This secondary frame is again constructed of two main structural members 62 and 63 separated by cross members. The flange 64 and related structures are provided to attach the secondary frame to the booster frame. As best shown in FIGS. 12 and 13 integrally formed beams 65 and grappling points 66 are provided for manipulation and load stabilization. A tail light panel 67 is provided and splash guards 68 may be incorporated.

Figure 14:
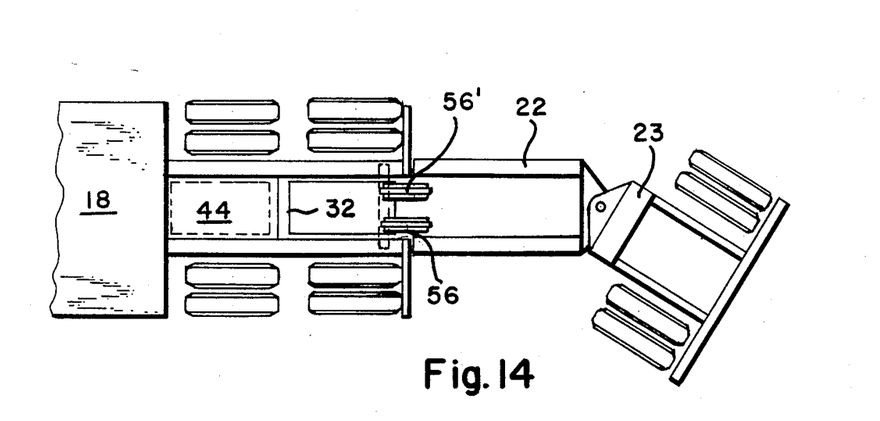
FIG. 14 is a top plane view of the general booster axle system illustrating both the free volume in front of the front suspension arm and the self steering action of the connection between the booster frame and secondary frame.

A simplified plan view of the rear part of a trailer system according to the present invention is illustrated in FIG. 14. The self-steering nature of the connection between a single axle secondary frame 23' and the booster frame 22 is shown. Duplex link elements 56 and 56' of pre-determined length are illustrated. The available space 44 between the front suspension arm 32 and the main frame deck 18 is emphasized.

Several variations in the construction of the front suspension arm, and its relations both to the main frame and the booster assembly, are illustrated in FIGS. 15-20. In each case the end of the front suspension arm toward the rear of the main frame (that is, toward the booster assembly) is provided with additional vertical extent. As illustrated the front suspension arm includes a downwardly directed portion 70. This additional extension of the end of the front suspension arm preferably is configured to avoid extension beyond the rear of the main frame or beyond the top of the main frame. This extended end is provided with one or more additional pivot points. The embodiment illustrated includes one additional pivot point at the lowermost end of the extension, pivot point 71, an additional pivot point 72 is located in a longitudinally medial portion of the front suspension arm. These additional pivot points on the front suspension arm generally correspond in location to pivot points on the main frame. All pivot points preferably consist of holes at the respective locations provided with bearing surfaces and adapted for passage of a fastener therethrough. The connection between a front suspension arm pivot point and a main frame pivot point is accomplished by the passage of a shaft from a main frame pivot point 39 on one side of the trailer to a corresponding main frame pivot point 39' on the other side of the trailer and passing through the corresponding pair of pivot points on the two structural elements which comprise the front suspension arm 32.

Figure 15:
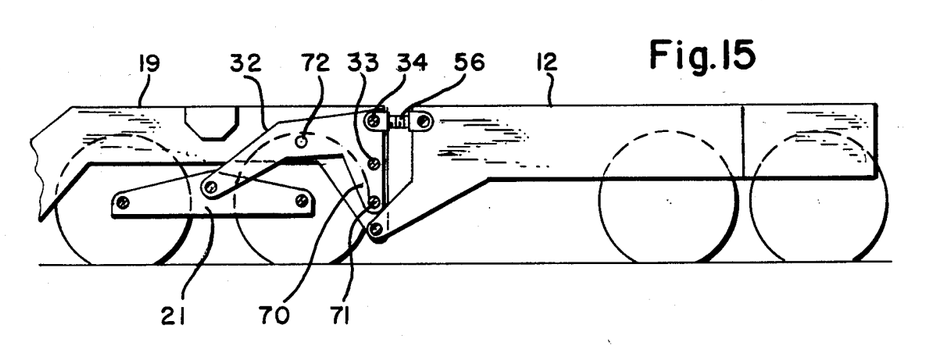
FIG. 15 illustrates a variation on the invention in which the front suspension arm and the rear of the main frame are provided with additional pivot points.
Figure 16:
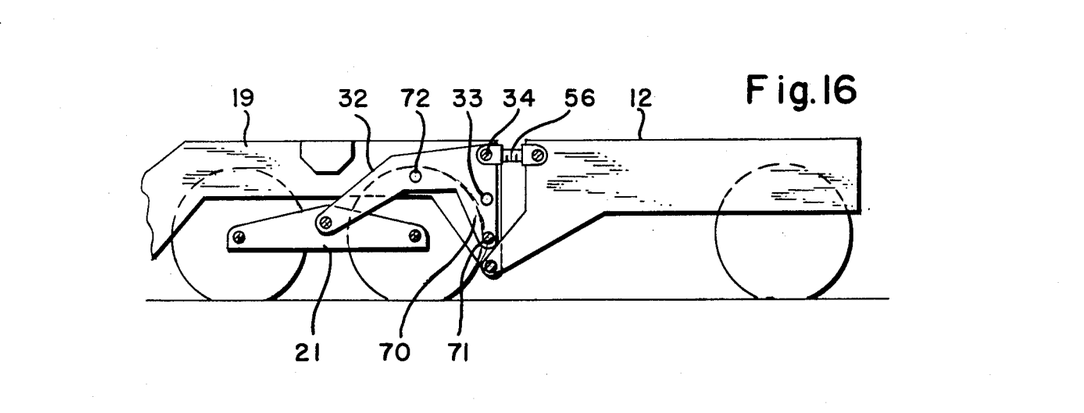
FIGS. 16, 17, 18, 19, and 20 illustrate the versatility which such additional pivot points impart to the connecting means, with FIGS. 19 and 20 particularly illustrating a variant which includes a front suspension arm extension.

The preferred configurations for two additional booster axles, on one hand, and one additional booster axles, on the other hand, are shown in FIGS. 15 and 16 respectively. Both configurations are shown with an adjustable link element 56. In the first configuration, with two booster axles, the front suspension arm is connected to the main suspension, is connected to the link element, and is pivoted to the main frame via pivot point 33 the first front suspension arm to main frame pivot point. As illustrated in FIG. 16, an adjustment of the forces involved to more uniformly distribute the weight of the load in the case of a single booster axle is accomplished by shifting the pivot point so that the connection is between the additional front suspension arm pivot point 71 and the corresponding location on the main frame.

Figure 17:
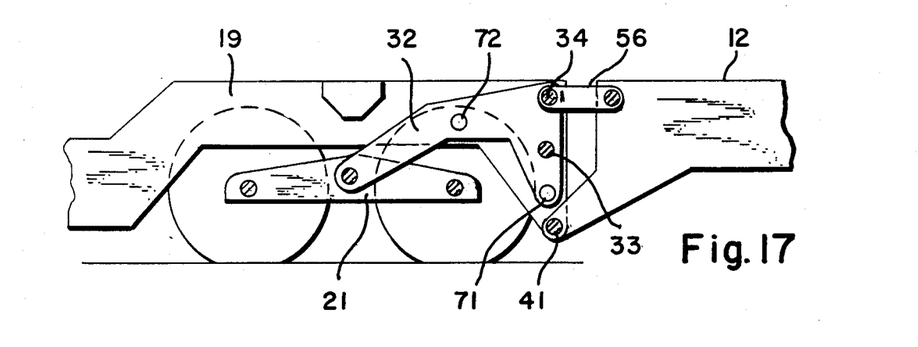

FIG. 17 illustrates the configuration for a tandem axle booster, with a link element having a fixed length. This is appropriate for a given desired distribution of weight to equalize a known load over a known number of booster axles.

Figure 18:
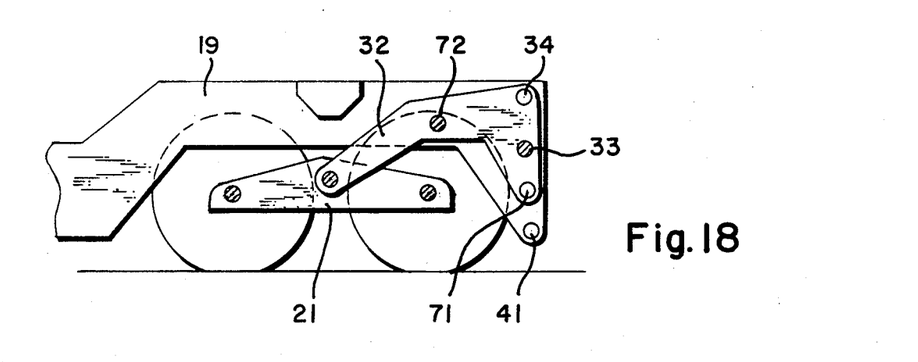

As seen in FIG. 18 when a booster assembly of the present of the present invention along with the link element is removed, the remaining structure does not extend excessively beyond the main frame of the trailer.

Figure 19:
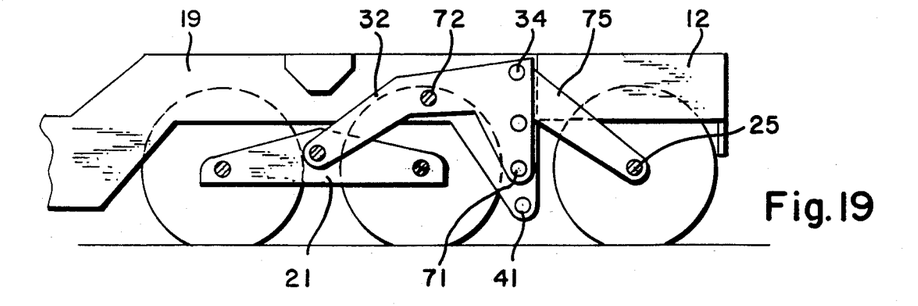
Figure 20:
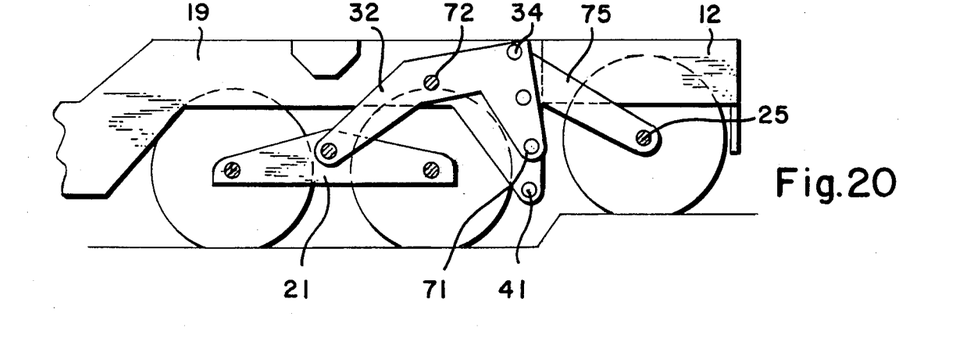

A further variation related to the present invention and which is particularly suitable for a situation in which there is a single booster axle is illustrated in FIGS. 19 and 20. The front suspension arm is provided with a non-pivoting extension 75 directed generally from the location where the link element would otherwise be attached downwardly and rearwardly to the single booster axle. The front suspension arm is again attached pivotally to the main suspension 21 and additionally through the medial pivot point 72 to the main frame at the corresponding location. As can be seen in FIG. 20, on uneven ground all axles of the group illustrated, including the booster axle tend to remain in contact with the ground and continue to contribute to an equalization of the load over all available axles.

Figure 21:
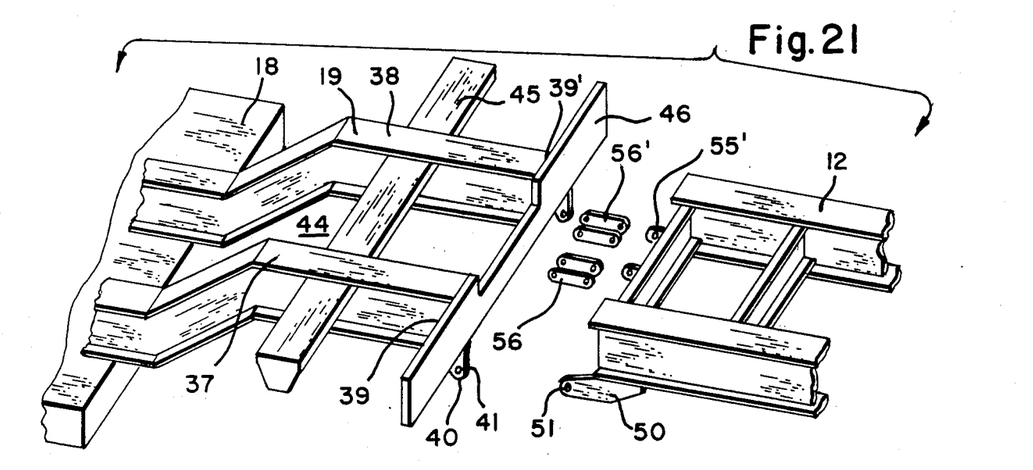
FIGS. 21, 22, and 23 are alternative views of a connection according to the present invention between the main frame and the booster assembly.
Figure 22:
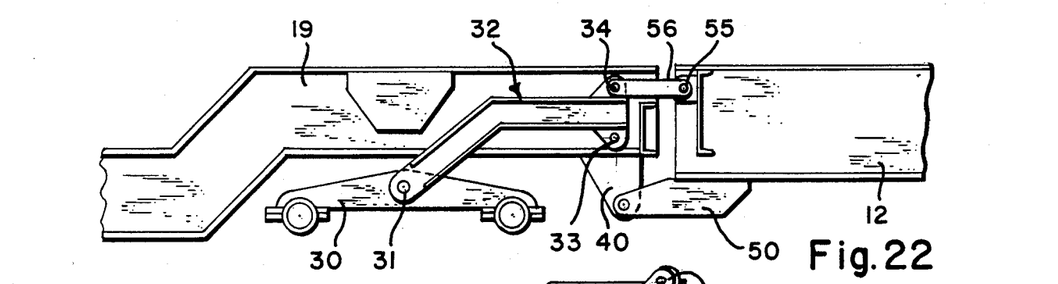
Figure 23:
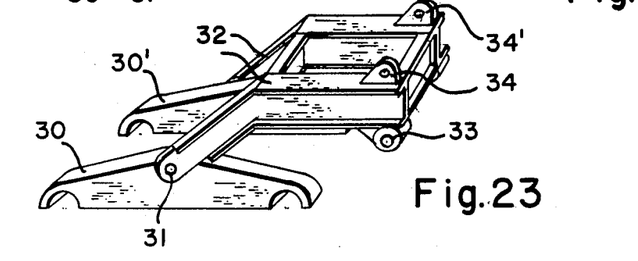

In FIGS. 21-23 a view of the main frame to booster assembly connection as a whole (FIG. 22) is accompanied by the exploded view of the connection with the front suspension arm removed for clarity in FIG. 21 and a perspective view of the front suspension arm 32 pivoted to the walk-beams 30 in FIG. 23.

Figure 24:
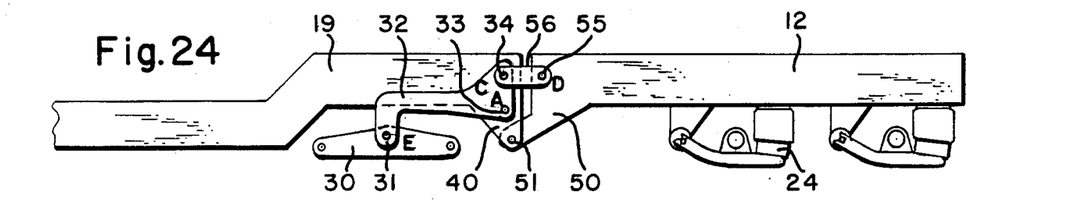
FIGS. 24 and 25 illustrate variations in this connecting means.
Figure 25:
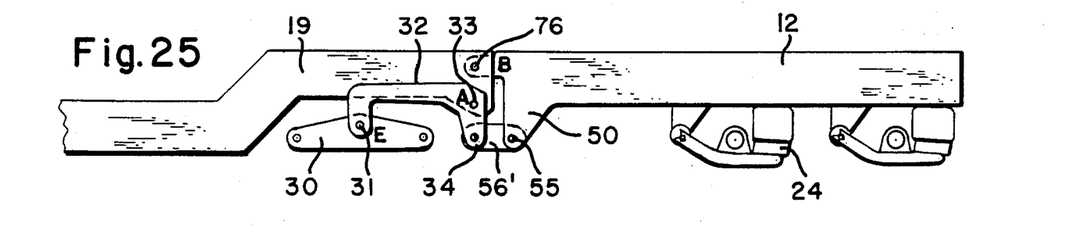

A simplified comparison of two configurations of the booster axle connection are shown in FIGS. 24 and 25. In the variant already described in detail, flanges from both the main frame and the booster assembly are directed downwardly and are connected to form one of the main pivot points. The front suspension arm 32 pivots on the main frame at 33. The link element 56 extends from the top of the end of the front suspension arm to the top of the booster assembly. Under load, the link element is subjected to compression load. In the variant shown in FIG. 25 the front suspension arm pivots at approximately the same place on the main frame as in FIG. 24. However, the booster assembly is provided with an additional flange 76 extending horizontally forward (along with a paired flange on the other side of the trailer.) The flange 76 is pivotally connected to the main frame near its top. In this embodiment, the main frame is not provided with a downwardly extending flange such as 40. Instead the front suspension arm has an additional downward extension at its rear end. A link element 56' connects the downwardly extending front suspension arm flange with the downwardly extending flange 50 of the booster assembly. When the trailer is loaded, this link connector is subjected to a tension load rather than a compression load. It should be noted that the configuration in which the link element is toward the top of the trailer provides the advantage that it is more convenient to "flip" a third axle; that is, to transport the booster axle on the trailer itself without completely detaching it, when it is not needed to support extreme loads.

While the dimensions of the trailer assembly of the present invention will vary in accordance with intended use and with such factors as the power unit to be used, the dimensions and weight of the payload, the structural material used, the anticipated terrain, and so on, particular prefered dimensions for one embodiment are listed below. In this particular embodiment, as generally shown in FIG. 1, the main suspension includes a tandem axle. A separate booster frame 12 is provided, and, as detailed in FIG. 11, the secondary frame 23 includes two separate booster axles 60 and 61. The preferable dimensions are given in inches but should be considered *relative* dimensions. Measurement is relative to the center of pivot points.

The main suspension 21 includes axles whose centers are 18.75 inches above the roadway. The distance from center to center to these two axles is 54 inches, with the walk-beam pivot 31 centered between them. The vertical distance from the top of the walk-beam to the bottom of the main frame is 10 inches. The main frame measures 14 inches across in a vertical direction. The lateral distance from the walk-beam pivot point 31 to the first front suspension arm to main frame pivot point 33 is 42 inches. The vertical center to center distance from the first front suspension arm to main frame pivot point 33 to the link element connecting point 34 it is 6 5/16 inches. The distance from the pivot point 33 to the end of the main frame is 12 inches. The vertical distance from the link element connecting point 34 to the main frame to booster assembly pivot point 41 is 25 inches. The lines through the walk-beam pivot point and the first front suspension arm to main frame pivot point, on the one hand, and the first front suspension arm to main frame pivot and the link element connecting point, on the other hand, are mutually perpendicular. The main frame to booster assembly pivot point 41 is centered 4 inches from the end of the main frame. The lateral distance from the walk-beam pivot point to a point half way between the centers of the two booster axles is 217 inches. The centers of the booster axles are each 27 inches from this later point and therefore 54 inches apart. The lateral distance from the first front suspension arm to main frame pivot point 33 to the center point between the twin booster axles is 175 inches. The general heights of the rear portion of the main frame, the highest portion of the booster frame, and the level of the secondary frame are $43\frac{1}{2}$ inches. The center to center distance from the walk-beam pivot point to the first front suspension arm to main frame pivot point is 44 7/64 inches. The center of the first front suspension arm to main frame pivot is $2\frac{1}{2}$ inches from the bottom of the main frame nearest the location of the pivot point. The lateral distance from the walk-beam pivot point to the first front suspension arm to main frame pivot point is 42 inches. The lateral distance from the walk-beam pivot point 31 to both the main frame to booster assembly pivot point 41 and the corresponding pivot point 51 on the booster frame vertical flange 50 (when the unit is assembled) is 50 inches. Also when the unit is assembled, the distance between the link element connecting points on the main frame and the booster frame 33 and 55 respectively is 24 inches. The assembled distance between the front frame and the booster frame is about 6 inches.

Referring to FIG. 4, the center to center distance between the main structural members 37 and 38 is 40 inches. The center to center distance between the structural members of front suspension arm 32 is $23\frac{7}{8}$ inches. The main frame structural members themselves are $9\frac{1}{2}$ inches wide, while the structural members of the front suspension arm are 6 inches wide. The width dimensions of the secondary frame in this embodiment are similar to the width dimension of the main frame. The overall length of the secondary frame as shown in FIG. 11 is 120 inches with an additional 12 inch flange 64 in front.

Whether the secondary frame carries tandem suspension, with its own walk-beam, or is provided as shown in FIG. 11 with independent axles 60 and 61, adjustable air bags 80 and 81 may be provided for raising and lowering the auxiliary suspension. The variable control of the secondary frame afforded by these height controls allows assembly and disassembly of the unit and further control of the weight distribution over the multiple axle system.

For the configurations shown in FIGS. 19 and 20, wherein a single booster axle is employed, the front suspension arm extension 75 is so arranged that the center of the booster axle is also 18.75 inches above the roadway and is the same distance (27 inches) behind the last main axle as the two main axles are from each other.

These dimensions are relative, approximate, and will be varied to suit different configurations. The means of connecting the pivot points of the present invention including materials and dimensions are known in this art and are laid out in more detail in U.S. Pat. No. 4,423,844 to Gevers.

The use and operation of the invention should be apparent from the above description. The unit is assembled in unloaded condition after the size of the payload is determined so that desired configuration can be planned. The main frame flange 40 and the booster frame vertical flange 50 are aligned by blocking, jacking, or the use of the rear suspension air bags 80 and 81 so that the corresponding pivot points on these flanges may be fastened. The linking element 56 is then fastened across the link element connection points of each of the main frame and the booster frame. For connecting links of predetermined length, further alignment may be necessary. This is less critical for a link element which is adjustable, such as a link element consisting of a threaded shaft 85 and threaded yokes 86 and 87. Such an adjustable linking element is shown most clearly in FIG. 7. The final desired adjustment for proper alignment and weight distribution may be made by adjustments in this threaded link element.

Even after assembly of the unit, as shown for example in FIG. 14, the available space 44 is not obstructed and access may be had to equipment and controls located there. FIG. 4 also clearly shows this available space.

When the primary embodiment of this unit is disassembled, as shown in FIG. 3, there are no protrusions or extensions either beyond the rear of the main frame or above the top of the main frame, providing a convenient and non-encroaching profile for moderate loads.

GENERAL CALCULATIONS AND THEORY OF OPERATION

Figure 26:
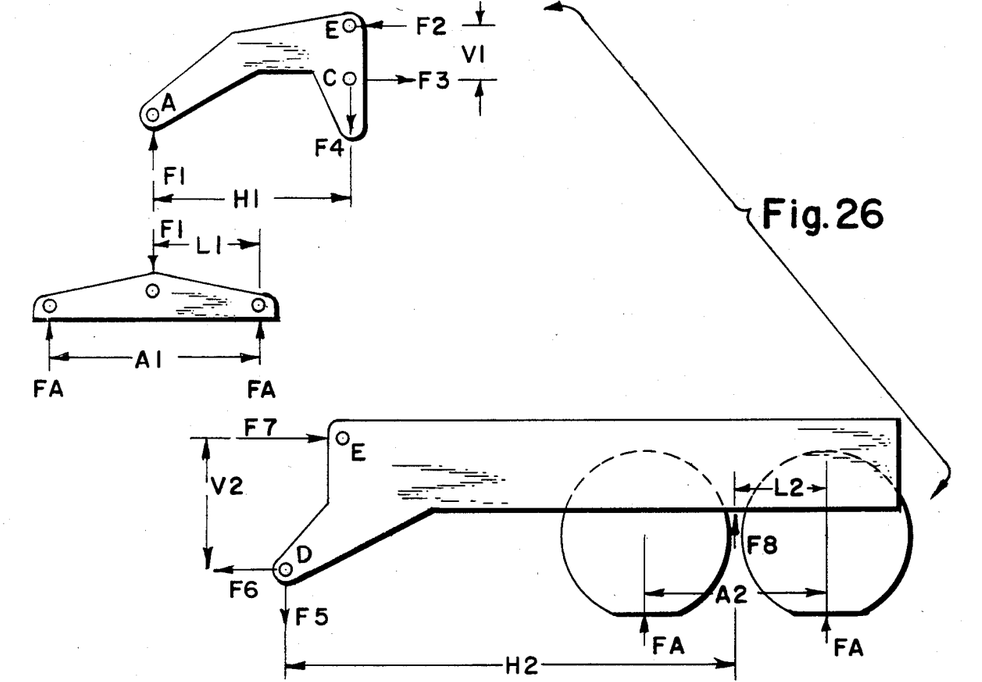
FIGS. 26–30 are diagrammatic views to assist in the discussion of the theory of operation (the FIG. 30 views are prior developments.)

The present invention provides equal weight distribution to each axle. Assume that the force on each axle is FA (Force per axle) as shown in FIG. 26 and arrive at the necessary geometry to insure equalization.

For equalization of the front suspension $L1 = A1/2$.
Then, $F1 = 2 \times FA$
(By summation of forces in the vertical direction: $F4 = F1$)
by summation of moments about point C $$F2 = F1 \times H1/V1 = 2 \times FA \times H1/V1 \qquad 1.$$

(By summation of forces in the horizontal direction: $F3 = F2$)
Since the forces on the rear two axles are equal, and, since $L2 = A2/2$, then F8 can replace FA where $F8 = 2 \times FA$ By summation of forces in the vertical direction ($F5 = F8 = 2 \times FA$)

By summation of moments of forces about point D:

$$F7 = F8 \times H2/V2 = 2 \times FA \times H2/V2 \qquad 2.$$

(By summation of forces in the horizontal direction: $F6 = F7$)

F2 and F7 are at opposite ends of a link arm; therefore, $F2 = F7$. Equating equations 1. and 2. yields:

$$2 \times FA \times H1/V1 = 2 \times FA \times H2/V2$$

Simplifying:

$$H1/V1 = H2/V2 \qquad 3.$$

Building the suspension to insure that equation 3. is satisfied guarantees equalization of the suspension (for the four axle configuration.)

Figure 27:
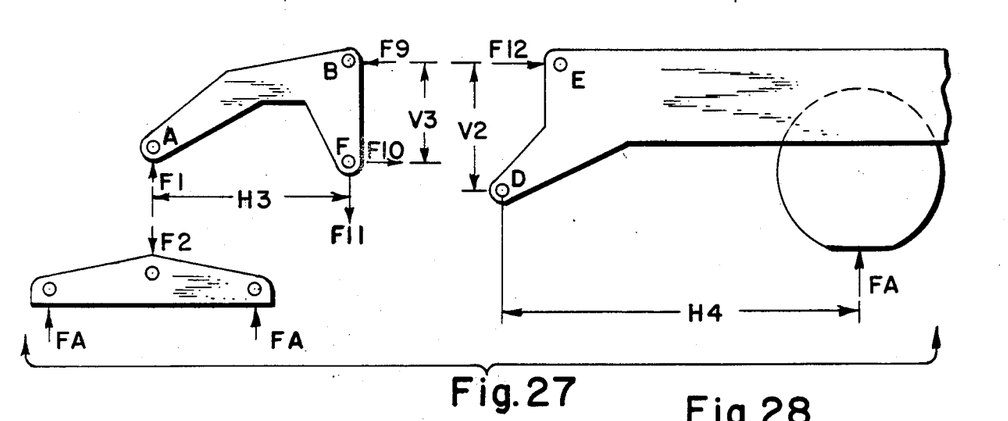

Similarly, for the configuration shown in FIG. 27 we will find the geometric relationship that will insure that the force per axle, FA, is the same at each axle.

As before, $F1 = 2 \times FA$; and by summation of the moments about point F $$F9 = 2 \times FA \times H3/V3 \qquad 4.$$

By summation of moments about point D: $F12 = FA \times H4/V2$

As before, $F9 = F12$ because these forces are at opposite ends of a link, so:

$$2 \times FA \times H3/V3 = FA \times H4/V2,$$

or:

$$H3/V3 \times 2 = H4/V2 \qquad 5.$$

This geometry guarantees equalization for the three-axle configuration.

Figure 28:
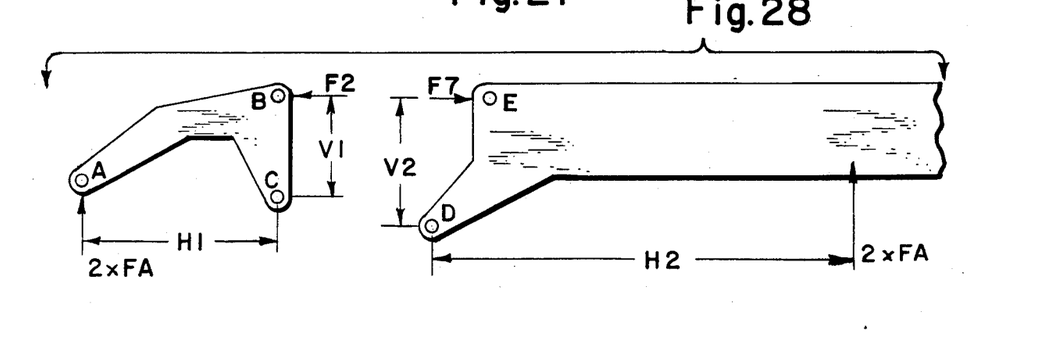

A simplified description of how equalization takes place follows, with reference to FIG. 28:

The reaction of the front suspension against the trailer is applied at point A. This reaction causes the front suspension arm to rotate up and back about point C and tends to lift the trailer frame at the attachment at the point C.

The same situation exists with the booster assembly. The axle reaction tends to rotate the booster frame up and forward around point D which helps lift the trailer at point D.

Points B and E are connected by a rigid compression link so that neither the front suspension arm nor the booster assembly can rotate independently.

The relationship between the lengths V1, H1, V2, H2 determine the amount of "leverage" that each part (front suspension arm or booster assembly) has over the other. With the correct dimensions the "leverage" balances and the weight on each axle is constant, even when the trailer traverses uneven terrain.

MORE SPECIFIC DESCRIPTION OF EQUALIZATION CRITERION

The purpose of the invention is to provide equal distribution of the weight of the payload to each axle so that on level or uneven terrain, each axle supports the same portion of the load.

Since not all the payloads are so heavy as to require the use of the full number of axles it is desirable to remove the unneeded axles and still have equalization with the remaining suspension.

Figures 29, 30:
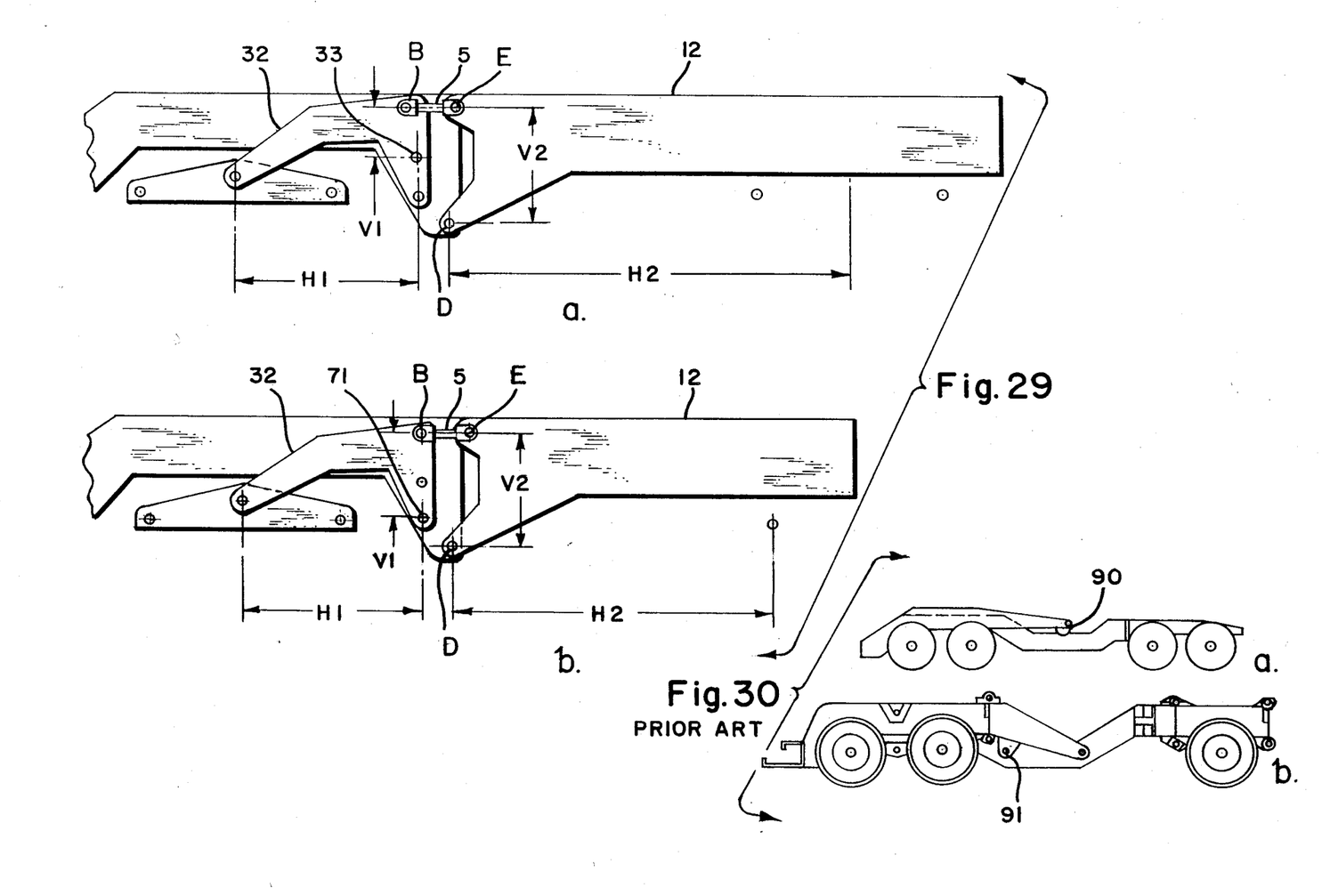

The method by which this object is met is to construct a suspension in two parts. As seen in FIG. 29, the front part is the forward suspension 32. The forward suspension is simply an arm which pivots about a point 33 (attached to the trailer frame) and which pivotally connects to the center of a connecting beam between the first two axles. The connecting beam can actually be a leaf spring or a system of air or hydraulic cylinders to provide some softness to the ride in addition to equalization between the first two axles.

The rear part of the suspension is similar to the first except that the rear suspension (the booster beam 12) is oriented in the opposing direction from the forward suspension. The front axles are forward of the forward suspension pivot 33 and the rearmost axles are behind the booster beam pivot "D".

If the front of the trailer is to the left in this view, then, in order to support the load, the front suspension arm must be forced counterclockwise to raise the point 33 and the trailer. On the other hand, the booster beam must be forced clockwise to support the load and the point "D".

To accomplish this rotational force a short link arm can be pivotally connected between the two suspension parts at points "B" and "E", thereby holding the two halves of the suspension apart at the top and supporting the payload.

To provide proper equalization, the suspension system must insure that the counterclockwise rotational force on the front suspension part is balanced by the clockwise rotational force on the rear suspension part (booster beam), in such a way that the front axle group supports the same weight per axle as the rear axle group regardless of the number of axles in the group. This balance of forces is accomplished by the particular geometry of this suspension system.

In particular, consider the following dimensions for a four-axle trailer (FIG. 29a):

The horizontal distance H1 times the vertical force equal to the load on the two front axles is the rotational moment trying to rotate the front suspension member clockwise. This rotational moment is resisted by a counterclockwise moment equal to the vertical distance V1 times the force on the connecting link 5.

Similarly, the counterclockwise moment on the rear suspension member (booster beam) is equal to the horizontal distance H2 times the vertical force equal to the load on the two rear axles. And, as in the front suspension member, the counteracting moment is the vertical distance V2 times the connecting link force.

Clearly, the connecting link force is the same value when applied to the front or rear suspension member and the horizontal distances H1 and H2 are determined by the required axle spacing. So only the vertical distances remain to be determined by the designer. These distances then have to be chosen according to the following relation:

$$V1/V2 = H1/H2$$

The dimensional relationship for the three-axle suspension is derived as follows (FIG. 29b):

The horizontal distance H1 and the vertical force from the load on the first two axles are the same as in the four-axle trailer. Likewise the vertical distance V2 is the same as before. The values that are different are the load on the rear axle group (which is ½ of the magnitude of the front axle group) and the vertical distance V1′.

The geometric design relationship now becomes:

$$V1'/V2 = 2 \times H1/H2$$

In summary, then, equalization is maintained if two pivots 33 and 71 are provided such that the distance V1 in the first calculation is determined to be $H1 \times V2/H2$ and the distance V1′ in the second calculation is determined to be $2 \times H1 \times V2/H2$.

Again, the basic purpose of this invention is to be able to distribute the weight of a trailer and payload equally among widely separated groups of axles. The most direct method to accomplish this task (and the method used in previous trailers) is to extend the frame of the trailer to a point midway between the trailer axle groups and at that point to provide a horizontal transverse pivot (point 90 in FIG. 30a.) At this point a longitudinal beam (booster beam) is pivotally connected that extends forward to the front axle group and rearward to the rear axle group. The trailer axles are then attached to the booster beam by either a walk beam, an air bag, a spring, or other commercially available suspension subunits.

This trailer equalizes axle loads because the booster beam-trailer frame pivot point is located at the correct "balance point" between the axle groups. The axles within the forward and rearward suspension groups equalize due to their own particular suspension system.

Examples of this are shown in FIGS. 30a and 30b (prior designs). In FIG. 30a the pivot point 90 is exactly ½ of the distance from the center of the first axle group to the center of the second axle group so that ½ of the weight is applied to the rear axle group. In FIG. 30b the pivot 91 is placed ⅓ of the distance so that ⅓ of the weight is applied to the rear axle group.

It can be seen then that with this design the trailer frame must be extended to reach the pivot point near the middle of the booster beam.

In the present invention, the equalizing pivot does not actually physically exist but rather is a "virtual" or "imaginary" point of rotation, thereby eliminating the need for the trailer frame extension.

Due to the unique geometry of this trailer suspension system, not only does the load equalization match that of the previous designs, but the vertical axle travel is identical. For example, in the four-axle design the front two axles raise exactly as much as the rear axles lower, if the trailer frame is held stationary. Similarly in the three-axle configuration, the front two axles raise half as much as the single axle lowers. The present design provides this same displacement relationship as in the prior design.

The displacement relationship is a demonstration of the equalization by the principle of "virtual work." According to the "virtual work" principle the force times the displacement of the front axle group should equal the force times the displacement of the rear axle group. In both the prior design and the present invention, this principle holds.

Clearly, minor changes may be made in the form and construction of this invention with departing from the material spirit. Therefore, it is not desired to confine the invention to the exact forms shown herein and described but it is desired to include all subject matter that properly comes within the scope claimed.

The invention having been thus described, what is claimed as new and desired to secure by Letters Patent is:

1. A trailer incorporating an equalizing booster axle system, comprising:
   (a) a main frame having a front portion and a rear portion,
   (b) a kingpin assembly connecting the front portion to a power unit,
   (c) a rear axle assembly connected to and supporting the rear portion via a main suspension system,
   (d) a booster assembly including a booster axle group and a secondary frame,
   (e) a front suspension arm pivotally connected at a first end to the main suspension and extending upwardly and rearwardly therefrom,
   (f) means pivotally connecting the front suspension arm to the main frame,
   (g) main pivoting means connecting the rear portion of the main frame directly to the secondary frame of the booster assembly, and
   (h) connecting link elements connecting the front suspension arm to the secondary frame of the booster assembly wherein each link element is pivotally connected at one end to the front suspension arm and at the other end to the secondary frame of the booster assembly.

2. A trailer as recited in claim 1, wherein the main frame has a deck portion, the rear portion of the main frame comprises two generally parallel structural elements, and the front suspension arm is substantially limited in forward extension by the rear axle assembly, whereby an available space is defined by the deck, the structural elements, and the front suspension arm.

3. A trailer as recited in claim 1, wherein the rear portion of the main frame has a top and a rearward end, the booster assembly has a forward end, and the front suspension arm is substantially limited in upward and rearward extension by the top of the main frame and the rearward end of the main frame respectively.

4. A trailer as recited in claim 1, wherein the main pivoting means includes a flange extending forwardly from the secondary frame of the booster assembly for pivotal connection to the rear portion of the main frame.

5. A trailer as recited in claim 1, wherein the main pivoting means connecting the rear portion of the main frame to the secondary frame of the booster assembly comprises: a flange extending downwardly from the rear portion and incorporating a pivot point, and a flange extending downwardly and forward of the secondary frame of the booster assembly and incorporating a corresponding pivot point.

6. A trailer as recited in claim 1, wherein the connecting link elements are adjustable in length.

7. A trailer as recited in claim 6, wherein in each connecting link element comprises a shaft threaded at each end and the pivotal connection at each end comprises a correspondingly threaded yoke.

8. A trailer as recited in claim 1, wherein the booster assembly further comprises a booster frame, the booster frame being connected to the main frame and the front suspension arm by the main pivoting means and the connecting link elements respectively, the secondary frame being connected to the booster frame in a horizontally pivoting manner.

9. A trailer as recited in claim 1, wherein the booster axle group of the booster assembly includes means of raising and lowering the secondary frame in relation to the booster axle group.

10. A trailer as recited in claim 1, wherein the second end of the front suspension arm includes a downward projection including at least one additional pivot point each pivot point located to achieve a chosen distribution of forces across a chosen number of booster axles.

11. A trailer as recited in claim 10, wherein the main suspension includes a walk-beam supporting tandem axles, a front axle and a rear axle, the front suspension arm is pivoted to the center of the walk-beam, and the front suspension arm is provided with a medial pivot point to the main frame located approximately directly over the rearward axle.

12. A trailer incorporating an equalizing booster axle system, comprising:
 (a) a main frame having a front portion and rear portion,
 (b) a kingpin assembly connecting the front portion to a power unit,
 (c) a rear axle assembly connected to and supporting the rear portion via a main suspension system,
 (d) a secondary frame supported by a booster axle via a secondary suspension,
 (e) a front suspension arm pivotally connected to the main suspension, extending upwardly and rearwardly from the main suspension, connected to the main frame by a medial pivot point, extending downwardly in a region at the rearward end of the main frame and there provided with a plurality of vertically spaced pivot points each pivot point located to achieve a chosen distribution of forces across a chosen number of booster axles, and
 (f) a front suspension arm extension rigidly attached to the front suspension arm and extending from the rearward portion of the front suspension arm to the suspension of the booster axle.

* * * * *